United States Patent
Hoog et al.

(10) Patent No.: US 10,474,826 B2
(45) Date of Patent: Nov. 12, 2019

(54) METHODS AND APPARATUSES FOR IMPROVED APP SECURITY TESTING

(71) Applicant: viaForensics, LLC, Oak Park, IL (US)

(72) Inventors: Andrew Hoog, Oak Park, IL (US); David Weinstein, Oak Park, IL (US)

(73) Assignee: VIAFORENSICS, LLC, Oak Park, IL (US)

( * ) Notice: Subject to any disclaimer, the term of this patent is extended or adjusted under 35 U.S.C. 154(b) by 165 days.

(21) Appl. No.: 15/131,556

(22) Filed: Apr. 18, 2016

(65) Prior Publication Data

US 2016/0306981 A1 Oct. 20, 2016

Related U.S. Application Data

(60) Provisional application No. 62/149,331, filed on Apr. 17, 2015.

(51) Int. Cl.
| | |
|---|---|
| *H04L 29/06* | (2006.01) |
| *G06F 21/57* | (2013.01) |
| *G06F 11/36* | (2006.01) |
| *G06F 21/56* | (2013.01) |

(52) U.S. Cl.
CPC ........ *G06F 21/577* (2013.01); *G06F 11/3664* (2013.01); *G06F 11/3692* (2013.01); *G06F 21/566* (2013.01); *G06F 21/562* (2013.01); *G06F 2221/033* (2013.01)

(58) Field of Classification Search
CPC .................................. H04L 12/00; G06F 9/00
See application file for complete search history.

(56) References Cited

U.S. PATENT DOCUMENTS

| | | | | |
|---|---|---|---|---|
| 2010/0064369 | A1* | 3/2010 | Stolfo | G06F 21/56 726/24 |
| 2013/0303281 | A1* | 11/2013 | Argiro | A63F 13/02 463/31 |
| 2013/0347094 | A1* | 12/2013 | Bettini | H04L 63/0245 726/11 |

* cited by examiner

*Primary Examiner* — Joseph P Hirl
*Assistant Examiner* — Leynna T Truvan
(74) *Attorney, Agent, or Firm* — alston & Bird LLP

(57) ABSTRACT

Embodiments are disclosed for performing static and/or non-emulated dynamic analysis of mobile computing device software to improve app security testing. In the context of a method, an example embodiment includes processing, by a security analysis system, an app for analysis. This example embodiment of the method further includes analyzing the app by diagnostic circuitry of the security analysis system. In this regard, analyzing the app includes at least one of performing static analysis on the app or causing performance, by a lab rig, of non-emulated dynamic analysis on the app. In turn, this example embodiment further includes generating, by the security analysis system and based on analyzing the app, a set of risk issues presented by the app, and outputting, by the security analysis system, the set of risk issues. Corresponding apparatuses and computer program products are also provided.

18 Claims, 11 Drawing Sheets

METHODS AND APPARATUSES FOR IMPROVED APP SECURITY TESTING

CROSS-REFERENCE TO RELATED APPLICATIONS

This application claims the benefit of U.S. Provisional Patent Application No. 62/149,331, filed Apr. 17, 2015, the entire disclosure of which is incorporated herein by reference.

TECHNOLOGICAL FIELD

Example embodiments of the present invention relate generally to security testing of software and, more particularly, to methods and apparatuses for performing static and non-emulated dynamic analysis of mobile computing device software.

BACKGROUND

Mobile computing devices including smart phones and tablet computers serve many functions in business, government, and personal computing. The essential aspects of mobile computing devices as we understand them today include a highly portable form factor enabling ease of use in many settings, usually with a touch screen interface and often combining telephone features; a combination of sensors and networking to enable many useful functions; and the ability to use dedicated "apps" (i.e., computer application software programs designed for mobile computing devices) that leverage the sensors and user interface to perform specific useful functions for the device user.

For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile computing devices. For example, the mobile operating systems named above each provide frameworks enabling apps to interact with location services circuitry, wired and wireless network interfaces, user contacts, and other services. Communication with hardware and software modules executing outside of the app is typically provided via application programming interfaces (APIs) provided by the mobile computing device operating system.

Accordingly, one consequence of the proliferation of mobile computing devices is that it has become possible for apps to gather and transmit extensive data, on various networks, regarding the user of the mobile computing devices. This data can include very sensitive information, such as the user's location, photos, communications, personal identification numbers, passwords, and both financial and health information.

SUMMARY

Developers, vendors, and users of apps have a strong interest in analyzing and assessing the nature and security of data being handled, stored, and transmitted by mobile computing devices, and in particular by apps running on such devices. Example embodiments described herein provide powerful new capabilities in this area. In particular, these embodiments offer an innovative and comprehensive way of testing apps for vulnerabilities and flaws that could compromise app integrity and/or its users' data, or detect malicious or suspicious app behaviors. To do so, example embodiments implement an intelligent fusion of time-constrained static app analysis and dynamic non-emulated app analysis, with a focus on properties and heuristics that are unique to mobile computing environments.

In a first example embodiment, a method is provided for improved app security testing. The method includes processing, by a security analysis system, an app for analysis, and analyzing the app by diagnostic circuitry of the security analysis system, wherein analyzing the app includes at least one of performing static analysis on the app or causing performance, by a lab rig, of non-emulated dynamic analysis on the app. The method further includes generating, by the security analysis system and based on analyzing the app, a set of risk issues presented by the app, and outputting, by the security analysis system, the set of risk issues.

In some embodiments, processing the app for analysis includes retrieving the app, and determining whether to perform static analysis on the app or cause performance of dynamic analysis on the app. In this regard, retrieving the app may include receiving the app from a user terminal in conjunction with an app analysis request, or retrieving the app via a crawler rig designed to proactively identify and harvest apps from a network. Additionally or alternatively, the determination of whether to perform static analysis on the app or cause performance of dynamic analysis on the app is based on one or more workflows designed for implementation by the security analysis system, the one or more workflows comprising distinct arrangements of static analysis tools and dynamic analysis designed for various evaluative purposes.

In some embodiments, performing static analysis on the app includes instantiating, by the diagnostic circuitry, one or more containers, wherein each container runs a corresponding tool for performing static analysis on the app, and for each of the one or more containers, consuming, by a tool running on the container, the app as binary data, producing output data by the tool, and storing the output data by the diagnostic circuitry.

In some embodiments, causing performance of non-emulated dynamic analysis on the app includes selecting the lab rig based on its compatibility with the app, causing instrumentation of the lab rig to facilitate capture of interactions by the app, causing execution of the app by the lab rig, recording instrumentation data from the lab rig during execution of the app, the instrumentation data including system interactions made by the app and network traffic initiated by the app, and upon completion of the dynamic analysis, causing the lab rig to execute a service returning the lab rig to a clean state.

In some embodiments, analyzing the app includes both performing static analysis on the app and causing performance of non-emulated dynamic analysis on the app. In this regard, performance of the static analysis may use information gained during performance of the dynamic analysis, and performance of the non-emulated dynamic analysis may use information gained during performance of the static analysis.

In some embodiments, outputting the set of risk issues includes at least one of generating a report identifying the set of risk issues using a standardized language, or generating a mapping of the set of risk issues to one or more known security standards.

In some embodiments, outputting the set of risk issues includes applying a risk rating to the set of risk issues based on standardized or customized rules.

In some embodiments, outputting the set of risk issues includes identifying user devices subscribed to a mobile intelligence service, determining which of the user devices subscribed to the mobile intelligence service have installed the app, and transmitting the set of risk issues to the user devices subscribed to the mobile intelligence service that have installed the app.

In a second example embodiment, an apparatus is provided for improved app security testing. The apparatus includes at least one processor and at least one memory storing computer-executable instructions, that, when executed by the at least one processor, cause the apparatus to process an app for analysis, and analyze the app by, wherein analyzing the app includes at least one of performing static analysis on the app or causing performance, by a lab rig, of non-emulated dynamic analysis on the app. The computer-executable instructions, when executed by the at least one processor, further cause the apparatus to generate, based on analyzing the app, a set of risk issues presented by the app, and output the set of risk issues.

In some embodiments, the computer-executable instructions, when executed by the at least one processor, further cause the apparatus to process the app for analysis by causing the apparatus to retrieve the app, and determine whether to perform static analysis on the app or cause performance of dynamic analysis on the app. In this regard, retrieving the app may include receiving the app from a user terminal in conjunction with an app analysis request, or retrieving the app via a crawler rig designed to proactively identify and harvest apps from a network. Additionally or alternatively, the determination of whether to perform static analysis on the app or cause performance of dynamic analysis on the app is based on one or more workflows designed for implementation by the security analysis system, the one or more workflows comprising distinct arrangements of static analysis tools and dynamic analysis designed for various evaluative purposes.

In some embodiments, the computer-executable instructions, when executed by the at least one processor, cause the apparatus to perform static analysis on the app by causing the apparatus to instantiate one or more containers, wherein each container runs a corresponding tool for performing static analysis on the app, and for each of the one or more containers, consume, by a tool running on the container, the app as binary data, produce output data by the tool, and store the output data.

the computer-executable instructions, when executed by the at least one processor, cause the apparatus to cause performance of non-emulated dynamic analysis on the app by causing the apparatus to select the lab rig based on its compatibility with the app, cause instrumentation of the lab rig to facilitate capture of interactions by the app, causing execution of the app by the lab rig, record instrumentation data from the lab rig during execution of the app, the instrumentation data including system interactions made by the app and network traffic initiated by the app, and upon completion of the dynamic analysis, cause the lab rig to execute a service returning the lab rig to a clean state.

In some embodiments, the computer-executable instructions, when executed by the at least one processor, cause the apparatus to analyze the app by causing the apparatus to both perform static analysis on the app and cause performance of non-emulated dynamic analysis on the app. In this regard, performance of the static analysis may use information gained during performance of the dynamic analysis, and performance of the non-emulated dynamic analysis may use information gained during performance of the static analysis.

In some embodiments, the computer-executable instructions, when executed by the at least one processor, cause the apparatus to output the set of risk issues by causing the apparatus to generate a report identifying the set of risk issues using a standardized language, or generate a mapping of the set of risk issues to one or more known security standards.

In some embodiments, the computer-executable instructions, when executed by the at least one processor, cause the apparatus to output the set of risk issues by causing the apparatus to apply a risk rating to the set of risk issues based on standardized or customized rules.

In some embodiments, the computer-executable instructions, when executed by the at least one processor, cause the apparatus to output the set of risk issues by causing the apparatus to identify user devices subscribed to a mobile intelligence service, determine which of the user devices subscribed to the mobile intelligence service have installed the app, and transmit the set of risk issues to the user devices subscribed to the mobile intelligence service that have installed the app.

In a third example embodiment, a computer program product including at least one non-transitory computer-readable storage medium is provided for improved app security testing. The at least one non-transitory computer-readable storage medium storing computer-executable instructions that, when executed, cause an apparatus to process an app for analysis, and analyze the app by, wherein analyzing the app includes at least one of performing static analysis on the app or causing performance, by a lab rig, of non-emulated dynamic analysis on the app. The computer-executable instructions, when executed, further cause the apparatus to generate, based on analyzing the app, a set of risk issues presented by the app, and output the set of risk issues.

In some embodiments, the computer-executable instructions, when executed, further cause the apparatus to process the app for analysis by causing the apparatus to retrieve the app, and determine whether to perform static analysis on the app or cause performance of dynamic analysis on the app. In this regard, retrieving the app may include receiving the app from a user terminal in conjunction with an app analysis request, or retrieving the app via a crawler rig designed to proactively identify and harvest apps from a network. Additionally or alternatively, the determination of whether to perform static analysis on the app or cause performance of dynamic analysis on the app is based on one or more workflows designed for implementation by the security analysis system, the one or more workflows comprising distinct arrangements of static analysis tools and dynamic analysis designed for various evaluative purposes.

In some embodiments, the computer-executable instructions, when executed, cause the apparatus to perform static analysis on the app by causing the apparatus to instantiate one or more containers, wherein each container runs a corresponding tool for performing static analysis on the app, and for each of the one or more containers, consume, by a tool running on the container, the app as binary data, produce output data by the tool, and store the output data.

the computer-executable instructions, when executed, cause the apparatus to cause performance of non-emulated dynamic analysis on the app by causing the apparatus to select the lab rig based on its compatibility with the app, cause instrumentation of the lab rig to facilitate capture of interactions by the app, causing execution of the app by the lab rig, record instrumentation data from the lab rig during execution of the app, the instrumentation data including system interactions made by the app and network traffic initiated by the app, and upon completion of the dynamic analysis, cause the lab rig to execute a service returning the lab rig to a clean state.

In some embodiments, the computer-executable instructions, when executed, cause the apparatus to analyze the app by causing the apparatus to both perform static analysis on the app and cause performance of non-emulated dynamic analysis on the app. In this regard, performance of the static analysis may use information gained during performance of the dynamic analysis, and performance of the non-emulated dynamic analysis may use information gained during performance of the static analysis.

In some embodiments, the computer-executable instructions, when executed, cause the apparatus to output the set of risk issues by causing the apparatus to generate a report identifying the set of risk issues using a standardized language, or generate a mapping of the set of risk issues to one or more known security standards.

In some embodiments, the computer-executable instructions, when executed, cause the apparatus to output the set of risk issues by causing the apparatus to apply a risk rating to the set of risk issues based on standardized or customized rules.

In some embodiments, the computer-executable instructions, when executed, cause the apparatus to output the set of risk issues by causing the apparatus to identify user devices subscribed to a mobile intelligence service, determine which of the user devices subscribed to the mobile intelligence service have installed the app, and transmit the set of risk issues to the user devices subscribed to the mobile intelligence service that have installed the app.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Figure 1:
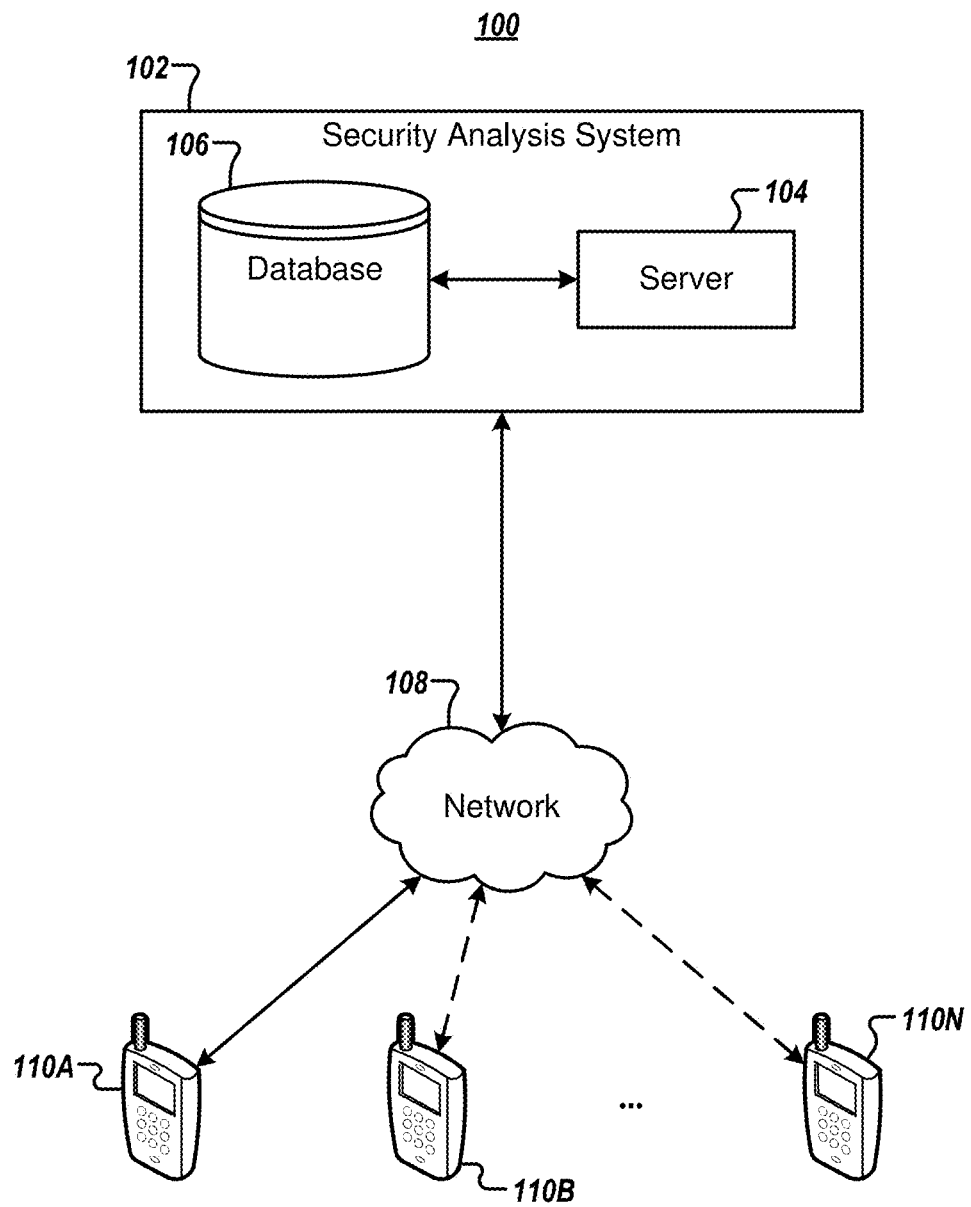
FIG. 1 illustrates a system diagram of various entities that may interact in accordance with some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Overview

Various parties may have an interest in analyzing and understanding the specific data that is handled, stored, or transmitted by a particular app, in many cases to assess the security of the app against standards, such as encryption of data at rest or in transit. The interested parties can include individual app users, businesses using apps, app developers, government regulators, law enforcement agencies, and others. One reason for this interest is that apps can modify mobile computing devices in unpredictable ways. They can modify system settings, use root access to change the device, or the like. To address this need, many traditional methods for analyzing apps run in emulators, rather than on actual mobile computing devices.

However, apps may exhibit many idiosyncrasies that cause them to run improperly on emulators. Thus, a need exists for methods that can analyze the security of an app on an actual mobile computing device rather than in an emulator. To do this, it is therefore very important to be able to restore mobile computing devices used for analysis back to an initial state. Example embodiments described herein allow provisioned mobile computing devices to have very low level control to address this need.

As noted previously, the operating system (OS) of a mobile computing device controls the device's sensors and interface, memory, and network. Apps leverage these resources through communication with the OS using APIs. However, the developer of the OS is very often independent of the app developer. Developers of the leading conventional mobile operating systems have not provided app developers with tools and instrumentation that would enable them to fully analyze and assess the data handled, stored, or transmitted by an app. Thus, an interested party must use a variety of tools and methods to attempt this investigation, and in many cases they fail to adequately assess apps due to the problems in performing the required analysis. Existing products fail to realistically emulate the operations of an actual user using a mobile computing device, leaving gaps in the coverage of security analysis. Moreover, some apps change their behavior when they can detect that they are running in an emulator. It will be understood that this type of behavior is not strictly for malware, because developers could innocently code functionalities into their apps that are only executed (or conversely, are avoided) when run on the emulator for testing purposes or other reasons. And because specially-crafted apps can hide malicious behavior by detecting emulation, entire areas of app functionality can be missed in simulated code execution. Moreover, emulators may have other idiosyncrasies. For instance, many subsections of the kernel for goldfish lag behind that of the MSM kernel (Qualcomm's kernel). For these reasons, the output from real devices is highly preferred over emulators.

Traditional anti-malware scanners are designed to search for binary signatures that are detected either on a filesystem or in memory. Such scanners operate on the assumption that there exists a component (a binary signature) that must remain static across all instantiations of the malicious code, and that this component does not share similarities with other benign applications frequently. Unfortunately, because the reliable identification of bounded-length viruses is NP-complete, comprehensively identifying binary signatures using only this technique lacks continued viability.

Moreover, static and dynamic analysis tools targeting mobile computing devices are still in nascent stages. For example, the inventors have observed that some tools take an unreasonable amount of time to perform emulated dynamic analysis and are not leveraging features learned during static analysis or other heuristics. Conventional static tools often make many errors in API analysis and other assumptions which lead to false positives and lack of trust in the tools. Conventional tools also often fail to capture network traffic generated during execution as a key artifact for analysis.

Accordingly, example embodiments described herein solve at least these problems by combining static (binary) analysis with dynamic analysis of app execution on actual mobile computing devices (rather than in an emulated environment) to reveal a complete and accurate picture of app data, interactions, and network activity. To do this, example embodiments utilize a specially instrumented mobile operating system, a unique combination of static and dynamic analysis software, and a captive network.

Example embodiments provide standardized output describing app behavior for repeatability, portability, and comparisons to other analysis routines, for detection of flaws, vulnerabilities or suspected malicious behavior. The output can include both descriptions and ratings (numeric or categorical). Accordingly, through the use of this unique combination of components, various embodiments disclosed herein provide a solution to the problems described above and illustrate robust mechanisms for improving the security analysis of apps designed to run on mobile computing devices. Example methods and apparatuses that implement these concepts are described in greater detail below.

System Architecture

Methods, apparatuses, and computer program products of the present invention may be embodied by any of a variety of devices. FIG. 1 discloses an example interaction diagram 100 to provide some context regarding the environment within which embodiments of the present invention may operate. Users may interact with a security analysis system 102 via a network 108 (e.g., the Internet, or the like) using user devices 110A through 110N. In some embodiments, the user device 110 may alternatively comprise a fixed terminal, such as a desktop computer or the like. While it is expected that at least one user will interact with the security analysis system 102 in this example interaction diagram 100, varying embodiments contemplate any number of users interacting with the security analysis system 102 via corresponding user terminals devices 110.

The security analysis system 102 may comprise a server 104 in communication with a database 106. The server 104 may be embodied as a computer or computers as known in the art. The server 104 may be operable to receive and process change data instructions provided by a user device 110 and/or other devices. The server 104 may also facilitate updating the database 106, by, for instance, storing information (such as risk issues identifying security vulnerabilities or the like) regarding apps that have been analyzed. The server 104 may also facilitate the generation and providing of various information to users in response to queries for information from the database 106.

In turn, the database 106 may be embodied as a data storage device such as a Network Attached Storage (NAS) device or devices, or as a separate database server or servers.

Each user device 110 may be embodied by any computing device known in the art. For example, the user device 110 may include laptop computers, smartphones, netbooks, tablet computers, wearable devices, or the like. In embodiments where the user device 110 is a mobile computing device, such as a smart phone or tablet, the user device 110 may execute an app to interact with the security analysis system 102.

Figure 2:
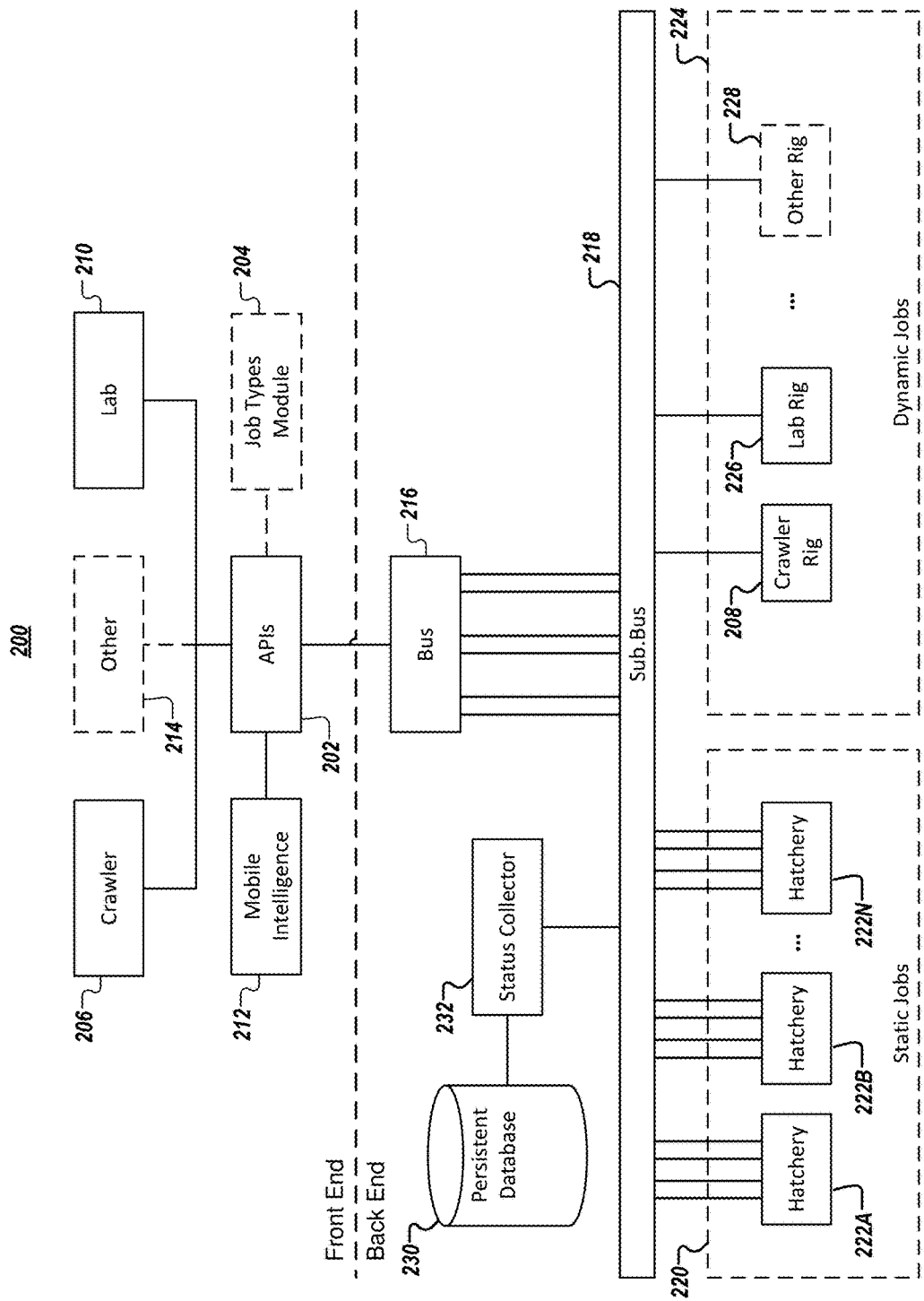
FIG. 2 illustrates a schematic diagram of a security analysis system for implementing some example embodiments described herein.

Turning now to FIG. 2, an environment 200 is illustrated in which a security analysis system 102 implements some example embodiments described herein. As shown in FIG. 2, the security analysis system 102 (which may comprise the "Back End" portion disclosed in FIG. 2) may itself a number of components designed to perform static analysis and manage performance of dynamic analysis. These components will be described below. First, however, the items illustrated in the "Front End" portion of FIG. 2 will be described. In this regard, interaction with the security analysis system 102 from a user device 110 will, primarily, take place through a series of API calls via one or more APIs 202. These APIs 202 may in turn define a number of job types (illustrated in job types module 204) that can be called to request action by the security analysis system 102. Crawler 206 may interact with the security analysis system 102, for instance, to obtain apps for analysis, either from an app store or from another source via a network. It will be understood that the security analysis system 102 may include a crawler rig 208 which proactively seeks new apps for analysis, although in some embodiments the security analysis system 102 may simply receive apps (e.g., from user devices 110)

in conjunction with requests from those user devices to analyze the transmitted apps, as represented by the Lab 208 icon, which can use API calls to request the security analysis system 102 to provide security analysis as-a-service (it will be understood that in some embodiments, these security features can be installed on-site at client locations rather than requiring communication via the cloud).

In some embodiments, various sets of user devices 110 may subscribe to a mobile intelligence app 212 provided by the security analysis system 102 itself. This mobile intelligence app 212 is designed to receive risk updates from the security analysis system 102 via a series of API calls. Finally, there may be other situations in which external devices may interact with the security analysis system 102, as represented by the "Other" icon 214.

Returning to the backend illustration of the security analysis system 102, a message bus 218 may transmit various job topics received via API calls and deliver them, (in some cases via a sub-bus 218) to different components of the system 102. For instance, static job topics may be delivered to the static jobs component 220, which can initialize a series of hatcheries 222A-222N to execute different static jobs (by instantiating one or more containers that execute in parallel to perform static analysis jobs). This static jobs component 220 is described in greater detail below in connection with FIGS. 5 and 10. Similarly, dynamic jobs can be delivered to dynamic jobs component 224, which may, for instance, cause physical devices to perform the corresponding function. For instance, a crawler rig 208 may retrieve new apps for analysis. Similarly a lab rig 226 (which may comprise a cluster of mobile computing devices) may be used to perform non-emulated dynamic analysis, as described below in connection with FIGS. 4 and 11. Finally, other rigs 228 may also be provided for other tasks.

Finally, the security analysis system 102 may include a status collector 230 that comprises a micro-service for collecting results from the message bus 218 and which persists those results to a persistent database 230. This persistent database may, in some embodiments, comprise an internal developed key-value store based partly on leveldb.

Figure 3:
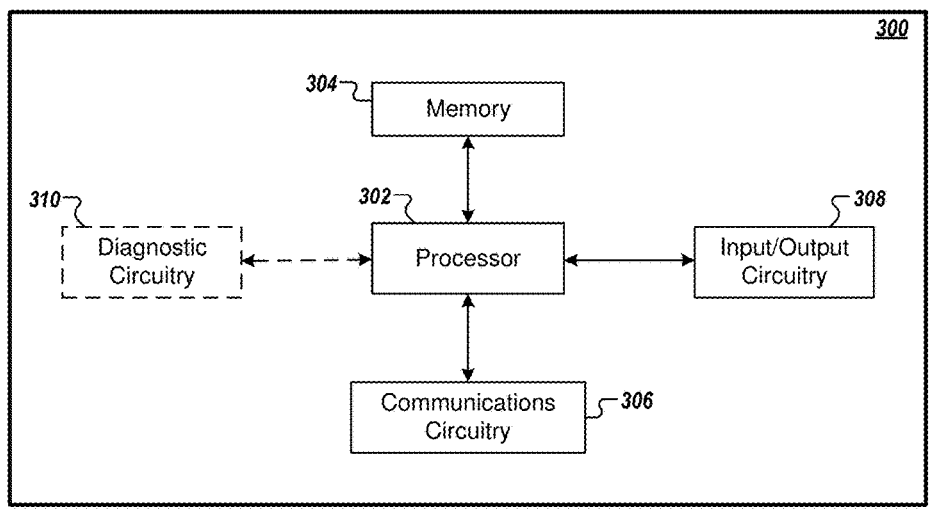
FIG. 3 illustrates a schematic block diagram of example circuitry embodying apparatuses that may perform operations in accordance with example embodiments described herein.

Turning to FIG. 3, an example apparatus 300 is illustrated that may represent a basic set of components that configured to implement the security analysis system 200. The apparatus 300 may include a processor 302, a memory 304, and communications circuitry 306. Some of the networked devices may further include input/output circuitry 308 for interacting with a user and diagnostic circuitry 310 for performance of app analysis and generation of risk issues therefrom. The apparatus 300 may be configured to execute the operations described below in connection with FIGS. 9-11. Although these components 302-310 are described with some functional descriptors, it should be understood that the particular implementations necessarily include the use of particular hardware. It should also be understood that certain of these components 302-310 may include similar or common hardware. For example, the diagnostic circuitry 310 may leverage use of the processor 302, memory 304, communications circuitry 306, or input/output circuitry 308 to perform its associated functions, and duplicate hardware is not required for the distinct components of the apparatus 300 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 300.

In some embodiments, the processor 302 (and/or co-processor or any other processing circuitry assisting or otherwise associated with the processor) may be in communication with the memory 304 via a bus for passing information among components of the apparatus. The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments contemplated herein.

The communications circuitry 306 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 306 may include, for example, a network interface for enabling communications with a wired or wireless communication network. For example, the communications circuitry 306 may include one or more network interface cards, antennae, buses, switches, routers, modems, and supporting hardware and/or software, or any other device suitable for enabling communications via a network. Additionally or alternatively, the communication interface 306 may include the circuitry for interacting with the antenna(s) to cause transmission of signals via the antenna(s) or to handle receipt of signals received via the antenna(s). These signals may be transmitted by the apparatus 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In some embodiments, the apparatus 300 may include input/output circuitry 308 that may, in turn, be in communication with processor 302 to provide output to a user and, in some embodiments, to receive an indication of user input. The input/output circuitry 308 may comprise a user interface and may include a display that may include a web user interface, a mobile application, a client device, or the like. In some embodiments, the input/output circuitry 308 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

In addition, the apparatus 300 may also comprise diagnostic circuitry 310, which includes hardware components designed to perform static and non-emulated dynamic analysis of an app, as well as generate risk issues identified during such app analysis. Diagnostic circuitry 310 may utilize processor 302, memory 304, or any other hardware component included in the apparatus 300 to perform this static analysis, and may further utilize communications circuitry 106 to communicate with one or more lab rigs to cause performance of non-emulated dynamic analysis.

Diagnostic circuitry 310 may utilize processing circuitry, such as the processor 302, to facilitate performance of its various operations, and may utilize memory 304 to store state computer instructions that, when executed, cause the diagnostic circuitry 310 to perform those operations and store information retrieved in response to performance of those operations. It should be appreciated that, in some embodiments, diagnostic circuitry 310 may include a separate processor, specially configured field programmable gate array (FPGA), or application specific interface circuit (ASIC) to perform the above-described functions. Diagnostic circuitry 310 is therefore implemented using hardware components of the apparatus configured by either hardware or software for implementing these planned functions.

As described above and as will be appreciated based on this disclosure, example embodiments may be implemented by a security analysis system having a plurality of networked devices, such as fixed devices, mobile devices, backend network devices, and/or the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated that, with respect to certain devices embodied by apparatus 300 as described in FIG. 3, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of an example device (e.g., apparatus 300) that may be utilized in a security analysis system to identify potential security risks presented by apps designed for use on mobile computing devices, example embodiments of the present invention are described below in connection with a series of components used for app analysis and flowcharts describing operations performed in some example embodiments of the present invention.

Components for App Analysis

Figure 4:
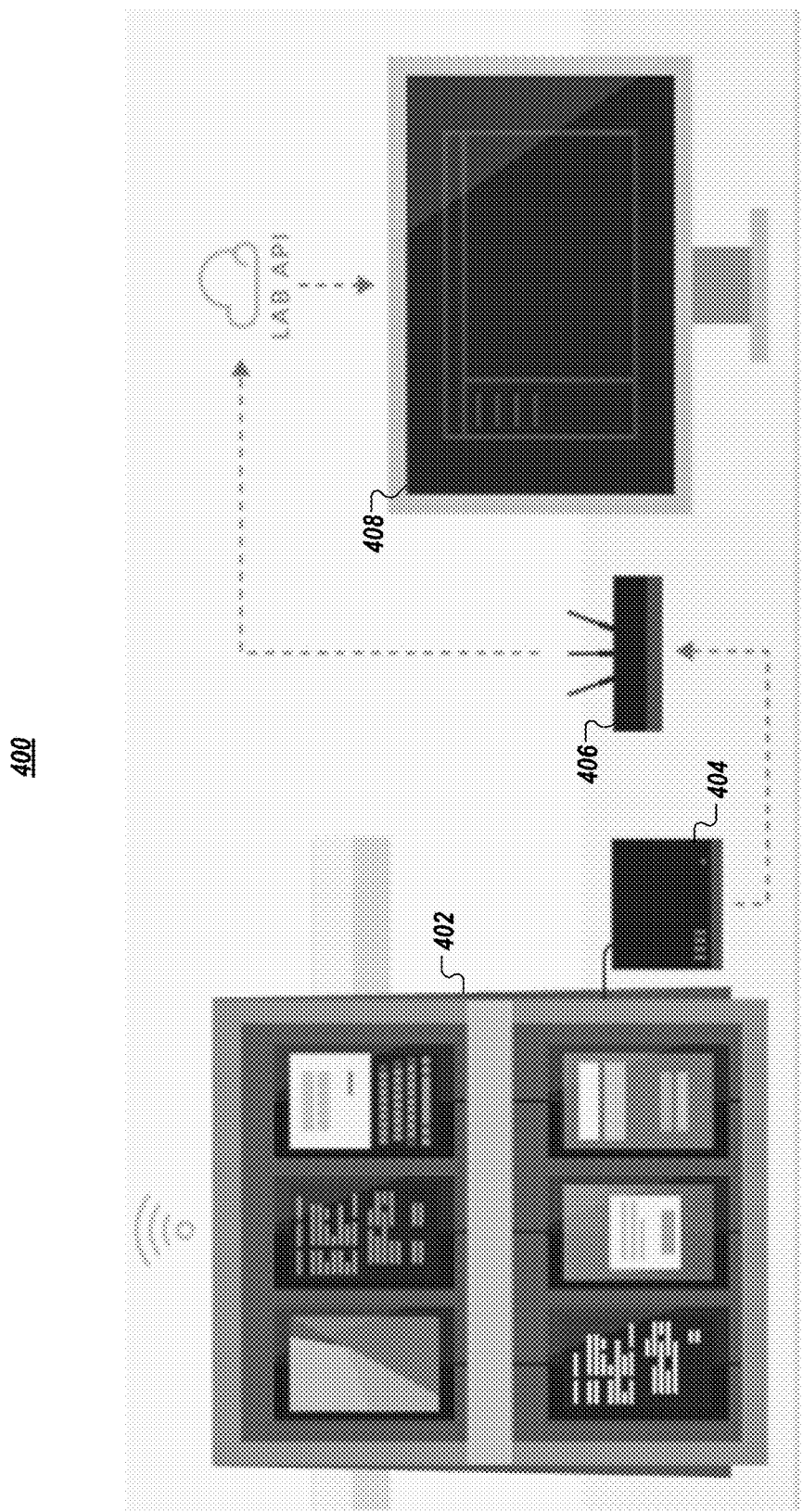
FIG. 4 illustrates a schematic diagram of an exemplary system arrangement for performing non-emulated dynamic analysis of an app, in accordance with some example embodiments discussed herein.

In FIG. 4, a schematic diagram is illustrated of an exemplary system arrangement for performing non-emulated dynamic analysis of an app. As shown in FIG. 4, one or more lab rigs 402 (which are equivalent to lab rigs 228, as described previously in connection with FIG. 2) may be connected to a controller 404, which in turn is connected to a router 406 in network communication with a computer 408. The computer 408 may comprise the security analysis system 102 (or another device), which orchestrates the non-emulated execution of the app for diagnostic purposes.

As applications run on this dynamic analysis system, instrumentation data is recorded, and a high level report summary is compiled and returned to the security analysis system 102 for either further use within static analysis or for storage or distribution to interested users. Greater detail regarding the underlying operations are provided below in connection with FIGS. 9 and 11.

Figure 5:
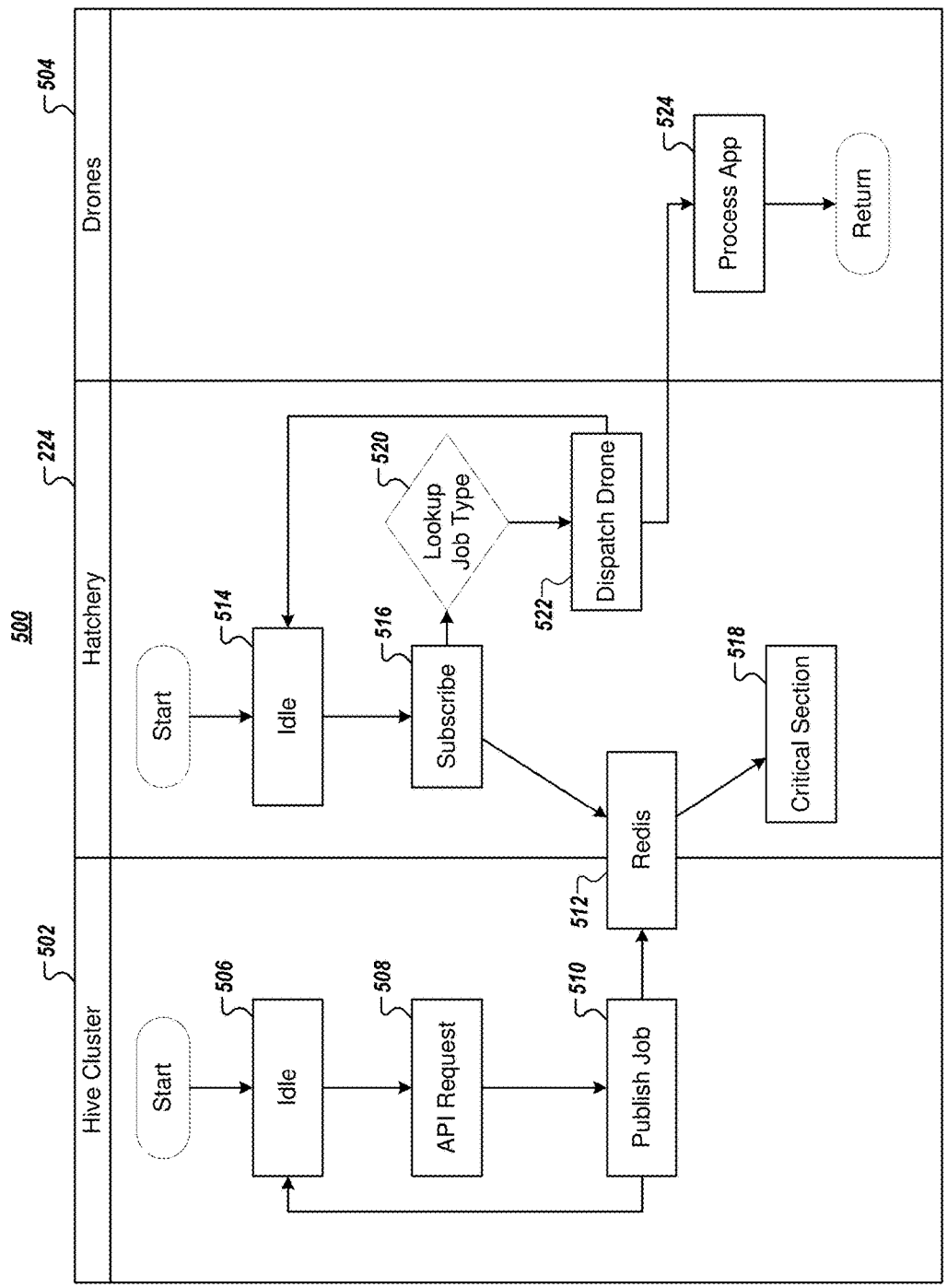
FIG. 5 illustrates a flowchart describing an exemplary process for performing static analysis of an app, in accordance with some example embodiments discussed herein.

Turning next to FIG. 5, an example data flow is illustrated for performing static analysis of an app, in accordance with some example embodiments discussed herein. Static analysis may be implemented via asynchronous execution of processing jobs using containers (or drones) 502 that are governed by control processes and a job queue. In this regard, the term container refers to a software instance that runs as an isolated process and that shares the kernel's resources with other containers, such as a Docker container. While FIG. 2 illustrates the use of a series of hatcheries 222, FIG. 5 provides a more specific illustration of an example workflow.

As shown in FIG. 5, a "hive cluster" 502 may sit idle at 506, and may be the element that receives the API call via the message bus 218 (at 508). The hive cluster 502 may in turn publish a job for execution (at 510) to a queue, which in some embodiments may comprise a Redis data store (512). In the meantime, a hatchery 222 may also initially sit idle (at 514), but may subscribe to the published job (at 516). Subsequently, the hatchery 222 may perform a table lookup at 520 to determine the job to be performed, and at 522 may instantiate a container 502 (e.g., dispatch a drone), which may then process the app (at 524), while the hatchery 222 returns to the idle state 514. Finally, it should be understood that critical section 518 regards jobs that cannot be concurrently executed by more than one container 502. In other words, these jobs require mutual exclusion of access to avoid asynchronous producer-consumer problems. A critical section 518 accesses a shared resource, such as a data structure, a peripheral device, or a network connection, that does not allow multiple concurrent accesses. A drone thus typically use a semaphore to execute jobs requiring access to the critical section 518 and prevent other drones from concurrently accessing the critical section 518 when executing other jobs in parallel.

Through the use of containers 502, example embodiments abstract the dependencies and complexity required by individual analysis tools away from the entities requesting execution of the tool. The result is that jobs run containers with tools that produce results and those results are persisted for later jobs or for storage or dissemination to users. Some example embodiments enable the composition of tools written in various languages and jobs together by isolating them into containers with their own dependencies. Example embodiments thus enable multi-step static analysis, the results of which can be processed into guided instructions for dynamic non-emulated analysis.

Figure 6:
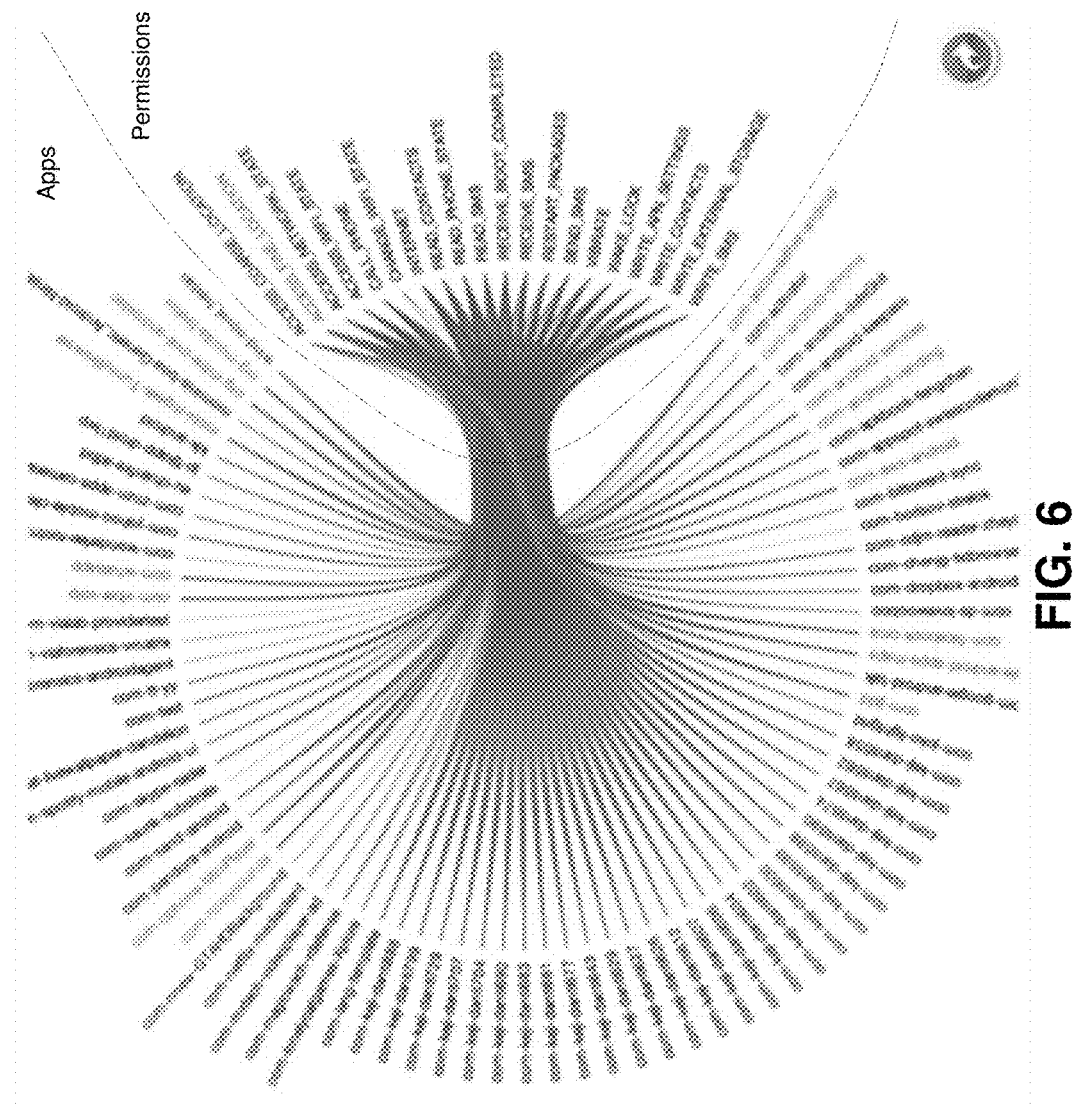
FIG. 6 illustrates an example visualization according to some example embodiments.

Turning now to FIG. 6, an example app-to-permission visualization interface is illustrated. Example embodiments contemplated herein facilitate the deployment of novel ways of visualizing the permissions requested by applications. In this regard, permissions are very high density pieces of information that provide clues regarding the potential functionalities of the application. Using the interface illustrated in FIG. 6, an analyst can compare multiple applications to each other. On the left side of the dotted line in FIG. 6 are app names and on the right are common permissions (although it will be understood that the locations of these app names and permissions may be changed in some embodiments). An analyst can quickly check forward and inverse mappings between the two using an interactive graphic by hovering over either the permission or application. Often, malicious apps will share the same profile of permissions requested or will be significant outliers in the permissions from other apps. Given a list of apps that have been analyzed using example embodiments described herein, an analyst can utilize this forward and inverse mapping to determine which apps fall are similar to each other and which are different, which can graphically illustrate clues regarding the potential relationships between apps and the possible risks presented by the apps. For example, one might see a permission that is very rarely requested by an app or "least densely connected" and then hover over it to determine which corresponding packages in the visualization use this permission. In this way, an analyst can quickly find patterns using the permission information alone.

Figure 7:
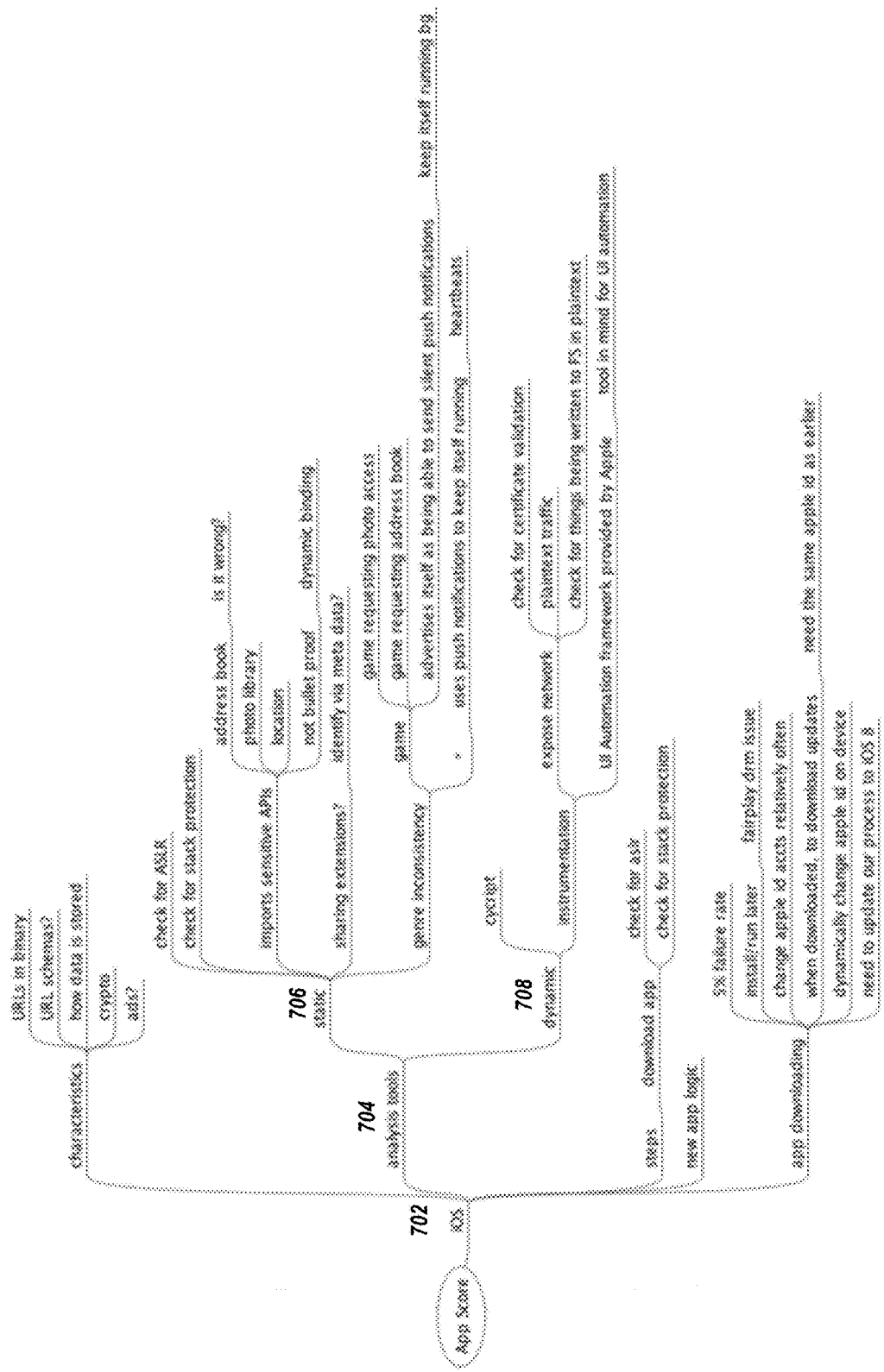
FIG. 7 illustrates an example mind map demonstrating a series of operations that may be utilized for app scoring, in accordance with example embodiments described herein.

Turning to FIG. 7 an example mind map is illustrated that demonstrates one set of operations that may be utilized for app scoring, in accordance with example embodiments described herein. As shown at 702 is one example set of techniques that may be used for scoring an app designed for use with iOS devices. At 704, the app scoring may be based on the utilization of analysis tools, which in this illustration may comprise static analysis (706) or dynamic analysis (708). For each tool, a series of corresponding evaluations are illustrated describing specific techniques that may be relevant to the scoring of an iOS app.

Figure 8:
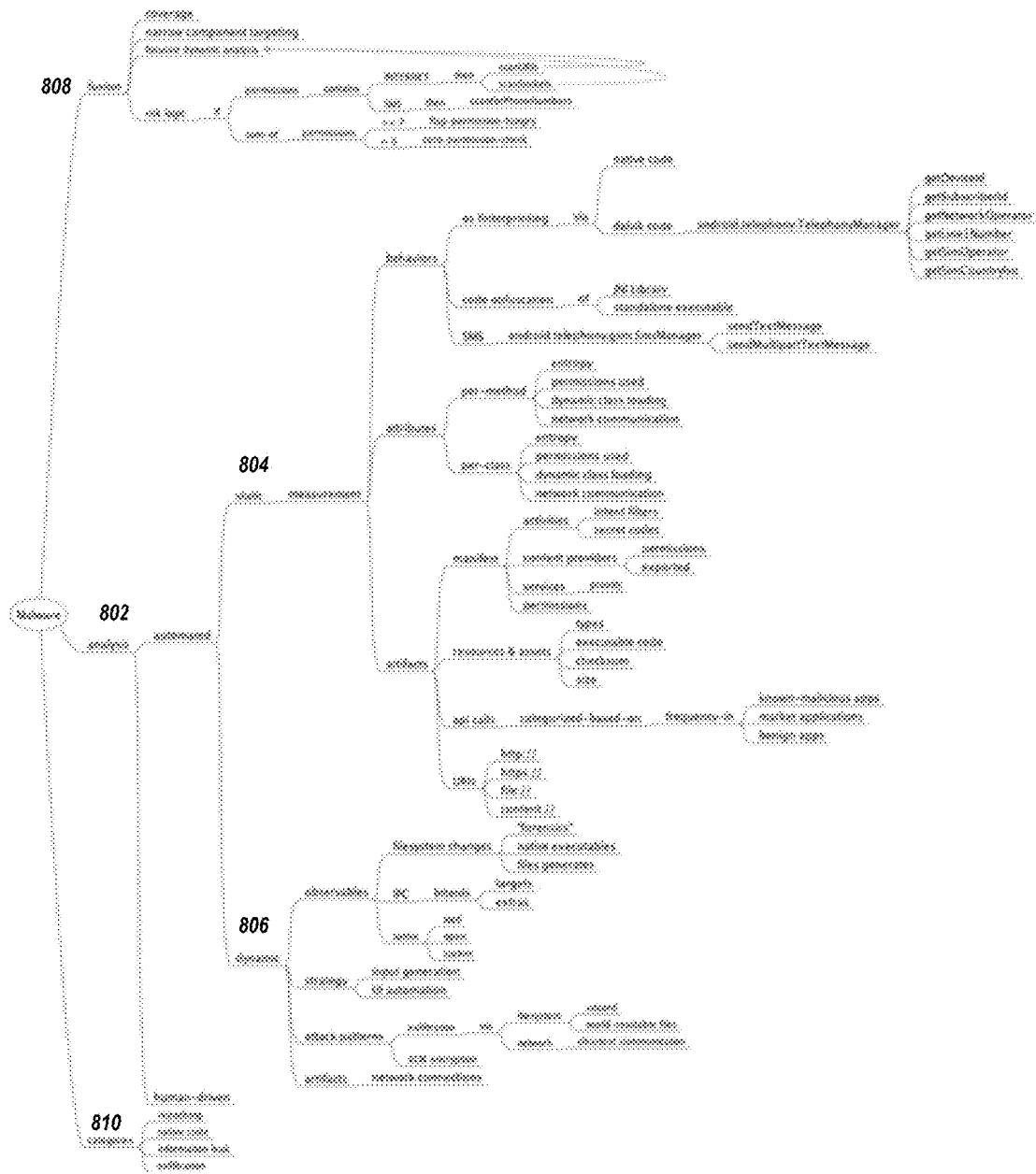
FIG. 8 illustrates an example mind map demonstrating a series of operations that may be utilized for malware categorization and analysis, in accordance with example embodiments described herein.

Turning next to FIG. 8, an example mind map is illustrated that demonstrates one series of operations that may be utilized for malware categorization and analysis, in accordance with example embodiments described herein. As shown at 802, an example security analysis system may perform analysis on an app. This analysis may comprise automated analysis comprising static analysis (804) or dynamic analysis (806), and in each instance, a series of possible evaluations are illustrated describing specific techniques that may be used to conduct those forms of analysis. Furthermore, as shown at 808, a fusion of static and dynamic analysis may be used. Finally, at 810, the risk issues associated with the app may be classified into a number of categories. In this regard, it should be noted that the steps in this analysis can (a) be branching, (b) have varying depth per branch, and (c) be either determinant or descriptive.

Operations for Identifying Security Risks Presented by Apps

Figure 9:
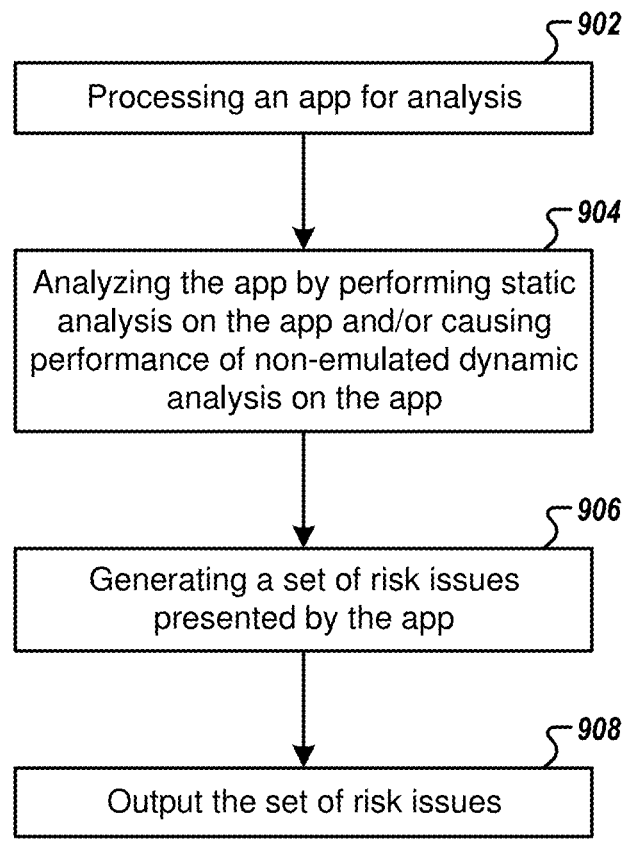
FIG. 9 illustrates a flowchart describing example operations for identifying potential security risks presented by apps designed for use on mobile computing devices, in accordance with some example embodiments described herein.
Figure 10:
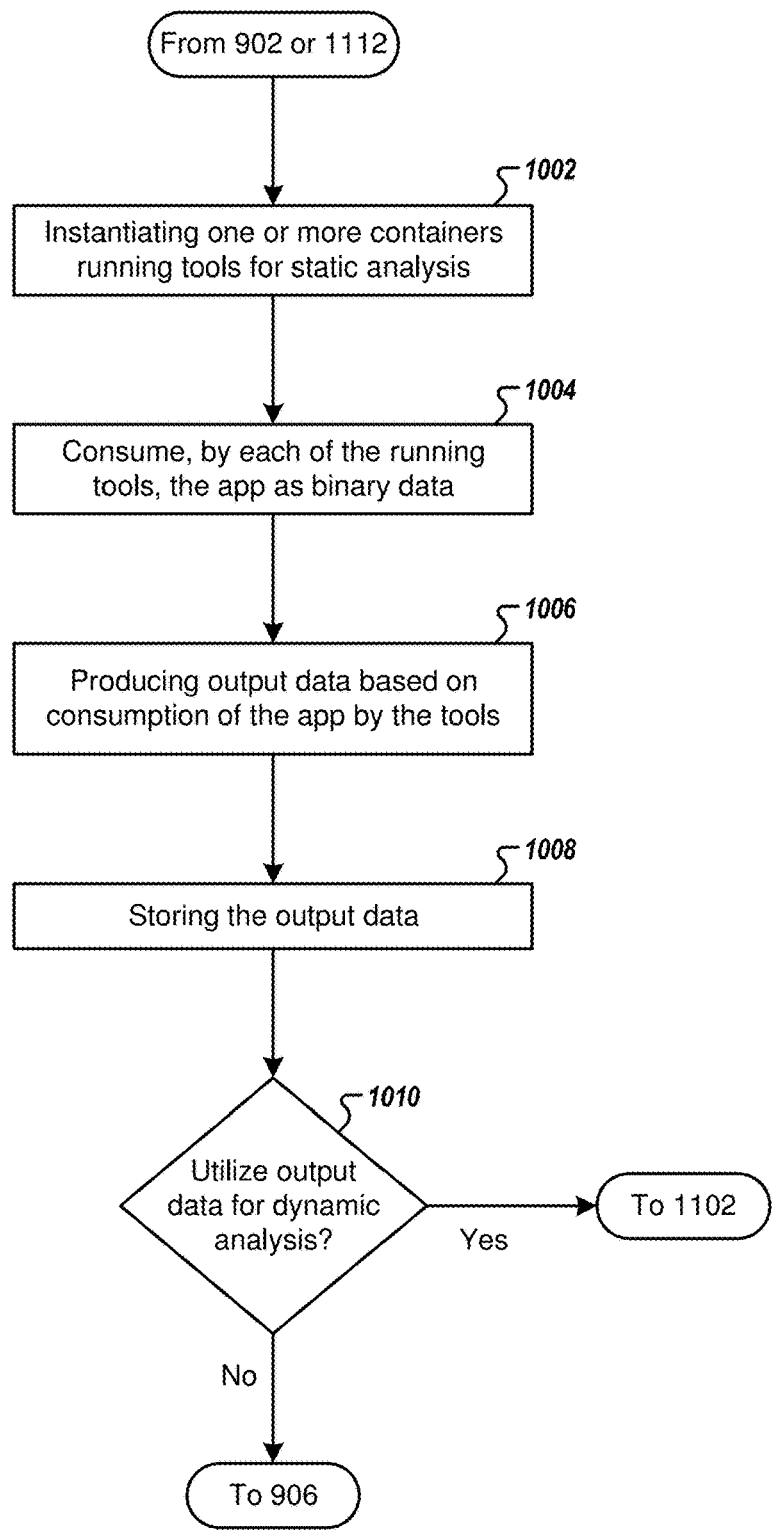
FIG. 10 illustrates a flowchart describing example operations for performing static analysis of an app, in accordance with some example embodiments described herein.
Figure 11:
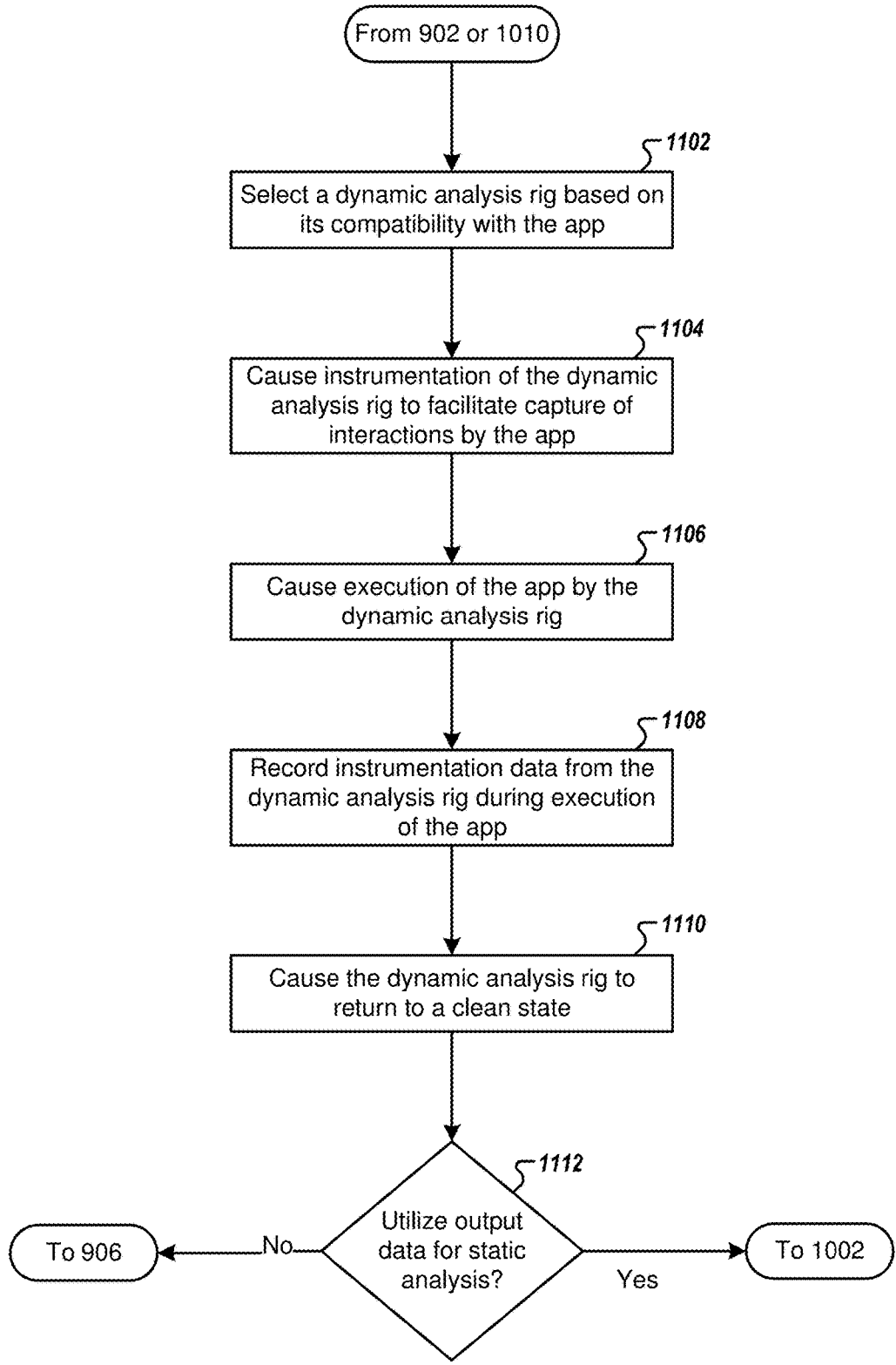
FIG. 11 illustrates a flowchart describing example operations for performing dynamic analysis of an app, in accordance with some example embodiments described herein.

Turning to FIGS. 9-11, flowcharts are illustrated that contain operations performed by a security analysis system to identify potential security risks presented apps designed for use on mobile computing devices. The operations illustrated in FIGS. 9-11 may, for example, be performed by, with the assistance of, and/or under the control of an apparatus 300 embodying the security analysis system, and more particularly through the use of one or more of processor 302, memory 304, communications circuitry 306, input/output circuitry 308, and diagnostic circuitry 310.

Turning first to FIG. 9, example operations are provided for performing app analysis of mobile computing device software to improve app security testing.

In operation 902 the apparatus 300 includes means, such as processor 302, memory 304, communications circuitry 306, input/output circuitry 308, or the like, for processing an app for analysis. In some embodiments, this operation may include sub-elements of retrieving the app and determining what type of analysis to perform on the app. Retrieving the app may in turn comprise receiving the app from a user terminal in conjunction with an app analysis request, or retrieving the app via a crawler rig designed to proactively identify and harvest apps from a network. Moreover, the determination of what type of analysis to perform on the app may include determining, by the apparatus 300, whether to perform static analysis on the app or cause performance of dynamic analysis on the app. This determination may be based on one or more workflows that are designed for implementation by the security analysis system. These workflows may in turn comprise instructions to utilize certain static analysis tools and non-emulated dynamic analysis and may specify an appropriate order for doing so. The workflows may be designed by analysts as standard measures for evaluating particular security risks presented by apps. Moreover, these workflows can comprise pre-configured logic, but in some embodiments may be decision driven by human analyst guiding system. The apparatus 300 may determine the proper workflow by evaluating system capability (e.g., analyzing whether a lab rig is available that is capable of running the app in question, or determining whether a static analysis tool is able to parse a given binary). Additionally or alternatively, the apparatus 300 may determine the proper workflow based on its configuration (e.g., whether a set process flow is provided by defaults or upon instantiation). As yet another additional or alternative mechanism the apparatus 300 may determine the proper workflow based on automated analysis flow from programmed logic, which can interpret output of analysis to affect subsequent processing steps.

In operation 904 the apparatus 300 includes means, such as diagnostic circuitry 310 or the like, for analyzing the app. It will be understood that analyzing the app includes at least one of performing static analysis on the app or causing performance, by a lab rig, of non-emulated dynamic analysis on the app. Static analysis is described above in connection with FIG. 5 and certain operations for performing static analysis are described in greater detail below in connection with FIG. 10. Similarly, non-emulated dynamic analysis is described above in connection with FIG. 4, and operations for causing performance of non-emulated dynamic analysis are described in greater detail in connection with FIG. 11. Moreover, as will be described in connection with FIGS. 10 and 11, it should be understood that static analysis and the dynamic analysis may be utilized in conjunction and, in doing so, the results of one type of analysis may be used to more finely focus the other. In any event, through a combination of static analysis and non-emulated dynamic analysis, embodiments contemplated herein are designed to capture and inspect network and forensic artifacts (including files, folders, keychain artifacts, and the like) for identification of sensitive data leakage, insecure configurations, attempts at hiding or obscuring behaviors, and other risks.

In operation 906 the apparatus 300 includes means, such as diagnostic circuitry 310 or the like, for generating, based on analyzing the app, a set of risk issues presented by the app. This set of risk issues may include those risks identified from performance of static analysis, non-emulated dynamic analysis, both types of analysis, or even recursively performed analysis of either nature that builds upon an understanding of the app gained from prior iterations of performance of either or both types of analysis.

In operation 908 the apparatus 300 includes means, such as processor 302, memory 304, communications circuitry 306, input/output circuitry 308, diagnostic circuitry 310, or the like, for outputting, by the security analysis system, the set of risk issues. In some embodiments, this operation may include generating a report identifying the set of risk issues using a standardized language and/or generating a mapping of the set of risk issues to one or more known security standards. For instance, this operation may use well-defined industry standard languages and structures such as MITRE's CyBOX, OVAL and MAEC. For instance, the apparatus 300 may provide a detailed description and mapping to security standards (OWASP, MITRE CWE) to ensure that each identified vulnerability or risk is well-explained. In addition to these descriptions, some embodiments may utilize risk rating(s), whether numerical (e.g., on a scale from 1 to 100) or categorized (e.g., "Low," "Medium," or "High") based on either standard or customized thresholds and/or rules. Accordingly, it will be understood that in some embodiments these thresholds and/or rules may be received by the apparatus 300 from a user.

Finally, outputting the set of risk issues may further include transmitting the set of risk issues to user devices subscribed to a mobile intelligence service for the purpose of receiving risk updates. To do this, the apparatus 300 may include means, such as processor 302, memory 304, or the like, for identifying user devices subscribed to a mobile intelligence service and for determining which of the user devices subscribed to the mobile intelligence service have installed the app. Subsequently, the apparatus 300 may include means, such as communications circuitry 306, input/output circuitry 308, or the like, for transmitting the set of risk issues to subscribed user devices that have installed the app being analyzed.

Turning next to FIG. 10, example operations are described for performing static analysis of an app, in accordance with example embodiments described herein. The operations illustrated in FIG. 10 may be reached from operation 902, described above, or from operation 1112 of FIG. 11 when the output data from dynamic analysis will be used for subsequent static analysis.

In operation 1002 the apparatus 300 includes means, such as diagnostic circuitry 310 or the like, for instantiating one or more containers. As described previously, these containers may comprise Docker containers and each container is configured to run a corresponding tool for performing static analysis on the app. Operations 1004, 1006, and 1008 below are then performed for each container instantiated.

In operation 1004 the apparatus 300 includes means, such diagnostic circuitry 310 or the like, for consuming, by a tool running on the container, the app as binary data. Rather than executing the app, then, each tool can investigate the design of the app to understand the potential security weaknesses posed by the app.

In operation 1006 the apparatus 300 includes means, such as diagnostic circuitry 310 or the like, for producing output data by the tool. This output data may be a set of risk issues, as described above. However, in some embodiments, this output data may also provide information that can be used to inform dynamic analysis of the app. In this regard, a tool may enable the apparatus 300 to determine the number of anticipated classes/functions included in the app, which can then inform the degree of coverage obtained during dynamic analysis. For example, on the Android platform, a tool can obtain the list of Activities which must be exposed via the Manifest and, using this list, the apparatus 300 may be able to determine which Activities must/should be launched during dynamic analysis to ensure adequate coverage.

In operation 1008 the apparatus 300 includes means, such as diagnostic circuitry 310 or the like, for storing the output data. In some embodiments, this output data may be stored in standardized formats, such as JavaScript Object Notation (JSON).

Finally, in operation 1010 the apparatus 300 includes means, such as diagnostic circuitry 310 or the like, for determining whether to utilize the output data for subsequent dynamic analysis. If so, then the procedure may advance to operation 1102 to perform dynamic analysis. Otherwise, the procedure may return to operation 906 for generating of the set of risk issues posed by the app.

Turning next to FIG. 11, example operations are described for performing dynamic analysis of an app, in accordance with example embodiments described herein. The operations illustrated in FIG. 11 may be reached from operation 902, described above, or from operation 1010 of FIG. 10 when the output data from static analysis will be used for subsequent dynamic analysis.

In operation 1102 the apparatus 300 includes means, such as diagnostic circuitry 310 or the like, for selecting the lab rig based on its compatibility with the app. In this regard, about one third of all apps use native libraries which only run on a single CPU architecture. Apps can contain native libraries for multiple architectures as well. Accordingly, selectivity regarding which apps are run on a particular device is needed, because a native library on one architecture may do very different things on another architecture. During APK install, the operating system pre-determines the native libraries that it needs and copies them to disk. The JNI loading system automatically chooses which library to load based on the device of which it is currently running. Thus, if a lab rig is chosen that uses a different operating system than that used by a particular user, then the risk profile produced from dynamic analysis may be completely different than the actual risks to which the user will be exposed by execution of the app. Accordingly, the security analysis system may be connected to a number of different lab rigs having different manufacturers and different operating systems to ensure that a lab rig is available that will properly execute the app and therefore facilitate diagnosis of risks posed by the app to a particular user's platform. By performing analysis using the proper device, example embodiments described herein facilitate the observance of the app with as much accuracy as possible to see what an end user would see.

In operation 1104 the apparatus 300 includes means, such as diagnostic circuitry 310 or the like, for causing instrumentation of the lab rig to capture interactions by the app. In some example embodiments, this further comprises modifying the lab rig to ensure that it can be rebooted into the bootloader and restored completely in almost all cases, which in turn facilitates the complete and automatic restoration of the device to working analysis order including installing auto-rooting, installing native hooks and custom loader, installing custom modules, disabling the lockscreen, disabling screen sleep, enabling debugging, and auto connecting to predefined networks. As noted previously, example embodiments instrument the mobile operating system to gain access to the volatile memory (RAM) and non-volatile memory (storage) of the mobile computing device, as well as the app package and runtime state. In conjunction, the network environment in which the lab rig is used is designed to facilitate the capture of data in transit using a segregated and dedicated network interface. Accordingly, example embodiments can access device data including files, folders, keychain artifacts, etc. affected by the app during non-emulated dynamic analysis.

In operation 1106, the apparatus 300 includes means, such as diagnostic circuitry 310 or the like, for causing execution of the app by the lab rig.

In operation 1108, the apparatus 300 includes means, such as diagnostic circuitry 310 or the like, for recording instrumentation data from the lab rig during execution of the app, the instrumentation data including system interactions made by the app and network traffic initiated by the app. In this regard, a controller connected to the lab rig may execute an intelligent user interface (UI) automator that provides fake data and interacts with the application to execute its functionalities as a real user would. The lab rig may at the same time execute services that capture, record, and analyze important system interactions made by the application. In some embodiments, the lab rig executing the app may capture these interactions, while the recording and analysis may be performed by a controller connected to the lab rig. Furthermore, a network proxy may be utilized that captures and analyzes application network traffic for interesting patterns and tainted values. Finally, as described in connection with operation 1108, the lab rig may execute a service that brings test devices to a clean state on each application run. It should be understood in this regard that in some embodiments the lab rig and controller comprise a bidirectional system, with the controller primarily containing automator logic, data store, and interfaces to network or other components, while devices on the lab rig interface with the app and mobile OS and perform direct operations on these. In such embodiments, the services may be executed through interaction between the lab rig and the controller.

In this regard, the information gathered from dynamic analysis may in some embodiments be grouped into the following high level categories: IPC issues (issues seen as the app generates messages communicating with other services on the device or within the application's runtime environment); network issues (privacy leaks such as GPS, advertising identifiers, passwords in the clear, Wi-Fi™ networks, Bluetooth™, MAC address, or the like); and filesystem issues (word writeable/readable files that other apps can abuse). Instrumentation collects various information from the dynamic analysis traces and logs them in a standard format such as JSON. These logs are encoded with timestamps so that the traces can be used to create visualizations. For example a trace might include network requests that occur after a request to retrieve the current location from the GPS sensor. Thus an analyst can clearly see the flow of information on the device. This information may then be exported into other formats (e.g., MAEC). Similarly, some embodiments may further utilize JSON schemas to describe the type of results for subsequent machine consumption.

Moreover, in some embodiments, this data can also be used to inform static analysis of the app. For instance, dynamic analysis leads to execution of code loaded during runtime, and sometimes that code is packed on the filesystem such that it would not have been detected via initial static analysis. Accordingly, by extracting the dynamically loaded objects from memory, performance of dynamic analysis can reveal code, which can then be statically analyzed. As another example, dynamic analysis can indicate the most common code paths executed by the app, thus indicating which areas of the app should be focused on with deeper static analysis. As yet another example, some example embodiments may utilize forensic analysis of residuals left on the lab rig during app execution to identify the potential of delayed triggers or application collusion, which may then warrant further analysis.

In operation 1110 the apparatus 300 includes means, such as processor 302, memory 304, communications circuitry 306, input/output circuitry 308, diagnostic circuitry 310, or the like, for causing the lab rig to execute a service returning the lab rig to a clean state upon completion of the dynamic analysis. This operation is largely facilitated by the prior performance of operation 1104, in which the lab rig is specially instrumented to ensure that facilitate low level control to address this need.

Accordingly, as described previously in connection with FIG. 4, example systems facilitating non-emulated dynamic analysis can use any of several mobile devices, a controller that interacts with apps being analyzed, a wireless router, and a computer ("host"). As applications run on the system, instrumentation data is recorded. At the end of the run, a high level report summary is compiled.

In operation 1112 the apparatus 300 includes means, such as diagnostic circuitry 310 or the like, for determining whether to utilize the output data for subsequent static analysis. If so, then the procedure may advance to operation 1002 to perform that subsequent static analysis. Otherwise, the procedure may return to operation 906 for generating of the set of risk issues posed by the app.

As described above, example embodiments of the present invention facilitate the analysis and assessment of the nature and security of data being handled, stored, and transmitted by mobile computing devices, and in particular by apps running on such devices. Example embodiments described herein provide powerful new capabilities in this area. In particular, these embodiments offer an innovative and comprehensive way of testing apps for vulnerabilities and flaws that could compromise app integrity and/or its users' data, or detect malicious or suspicious app behaviors. To do so, example embodiments implement an intelligent fusion of static analysis and dynamic non-emulated app analysis to identify risk issues and assess their severity.

FIGS. 9-11 illustrate flowcharts describing the operation of apparatuses, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus 300 employing an embodiment of the present invention and executed by a processor of the apparatus 300. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for improved app security testing, the method comprising:
processing, by a security analysis system, an app for analysis;
analyzing the app by diagnostic circuitry of the security analysis system, wherein analyzing the app includes at least performing static analysis on the app and causing performance, by a lab rig, of non-emulated dynamic analysis on the app by:
selecting the lab rig based on its compatibility with the app;
causing instrumentation of the lab rig to facilitate capture of interactions by the app;
causing execution of the app by the lab rig;
recording instrumentation data from the lab rig during execution of the app, the instrumentation data including system interactions made by the app and network traffic initiated by the app; and
upon completion of the non-emulated dynamic analysis, causing the lab rig to execute a service returning the lab rig to a clean state, wherein causing the lab rig to execute a service returning the lab rig to a clean state comprises:
auto-rooting the lab rig,
installing native hooks and custom loader to the lab rig,
installing custom modules to the lab rig, and
auto connecting the lab rig to one or more predefined networks,
generating, by the security analysis system and based on analyzing the app, a set of risk issues presented by the app; and
outputting, by the security analysis system, the set of risk issues.

2. The method of claim 1, wherein processing the app for analysis includes:
retrieving the app; and
determining whether to perform static analysis on the app or cause performance of dynamic analysis on the app.

3. The method of claim 2, wherein retrieving the app includes:
receiving the app from a user terminal in conjunction with an app analysis request; or
retrieving the app via a crawler rig designed to proactively identify and harvest apps from a network.

4. The method of claim 2, wherein the determination of whether to perform static analysis on the app or cause performance of dynamic analysis on the app is based on one or more workflows designed for implementation by the security analysis system, the one or more workflows comprising distinct arrangements of static analysis tools and dynamic analysis designed for various evaluative purposes.

5. The method of claim 1, wherein performing static analysis on the app includes:
instantiating, by the diagnostic circuitry, one or more containers, wherein each container runs a corresponding tool for performing static analysis on the app; and
for each of the one or more containers,
consuming, by a tool running on the container, the app as binary data,
producing output data by the tool, and
storing the output data by the diagnostic circuitry.

6. The method of claim 1, wherein performance of the static analysis uses information gained during performance of the non-emulated dynamic analysis.

7. The method of claim 1, wherein the non-emulated dynamic analysis is caused to be performed by the lab rig using the information gained during performance of the static analysis.

8. The method of claim 7, wherein the information gained during performance of the static analysis comprises at least a set of static analysis risk issues and a set of anticipated classes or functions in the app.

9. The method of claim 1, wherein outputting the set of risk issues includes at least one of:
generating a report identifying the set of risk issues using a standardized language, or
generating a mapping of the set of risk issues to one or more known security standards.

10. The method of claim 1, wherein outputting the set of risk issues includes: applying a risk rating to the set of risk issues based on standardized or customized rules.

11. The method of claim 1, wherein outputting the set of risk issues includes:
identifying user devices subscribed to a mobile intelligence service;
determining which of the user devices subscribed to the mobile intelligence service have installed the app; and
transmitting the set of risk issues to the user devices subscribed to the mobile intelligence service that have installed the app.

12. An apparatus for improved app security testing, the apparatus comprising at least one processor and at least one memory storing computer-executable instructions, that, when executed by the at least one processor, cause the apparatus to:
process an app for analysis;
analyze the app, wherein analyzing the app includes at least performing static analysis on the app and causing performance, by a lab rig, of non-emulated dynamic analysis on the app by:
selecting the lab rig based on its compatibility with the app;
causing instrumentation of the lab rig to facilitate capture of interactions by the app;
causing execution of the app by the lab rig;
recording instrumentation data from the lab rig during execution of the app, the instrumentation data including system interactions made by the app and network traffic initiated by the app; and
upon completion of the non-emulated dynamic analysis, causing the lab rig to execute a service returning the lab rig to a clean state, wherein causing the lab rig to execute a service returning the lab rig to a clean state comprises:
auto-rooting the lab rig,
installing native hooks and custom loader to the lab rig,
installing custom modules to the lab rig, and
auto connecting the lab rig to one or more predefined networks,
generate, based on analyzing the app, a set of risk issues presented by the app; and output the set of risk issues.

13. The apparatus of claim 12, wherein the computer-executable instructions, when executed by the at least one processor, cause the apparatus to perform static analysis on the app by causing the apparatus to:
instantiate one or more containers, wherein each container runs a corresponding tool for performing static analysis on the app; and
for each of the one or more containers:
consume, by a tool running on the container, the app as binary data,
produce output data by the tool, and
store the output data.

14. The apparatus of claim 12, wherein performance of the static analysis uses information gained during performance of the non-emulated dynamic analysis.

15. The apparatus of claim 14, wherein the information gained during performance of the static analysis comprises at least a set of static analysis risk issues and a set of anticipated classes or functions in the app.

16. The apparatus of claim 12, wherein the computer-executable instructions, when executed by the at least one processor, cause the apparatus to cause performance of the non-emulated dynamic analysis by the lab rig using the information gained during performance of the static analysis.

17. The apparatus of claim 12, wherein the computer-executable instructions, when executed by the at least one processor, cause the apparatus to output the set of risk issues by causing the apparatus to:
identify user devices subscribed to a mobile intelligence service;
determine which of the user devices subscribed to the mobile intelligence service have installed the app; and
transmit the set of risk issues to the user devices subscribed to the mobile intelligence service that have installed the app.

18. A computer program product comprising at least one non-transitory computer-readable storage medium for improved app security testing, the at least one non-transitory computer-readable storage medium storing computer-executable instructions that, when executed, cause an apparatus to:
process an app for analysis;
analyze the app, wherein analyzing the app includes at least performing static analysis on the app and causing performance, by a lab rig, of non-emulated dynamic analysis on the app by:
selecting the lab rig based on its compatibility with the app;
causing instrumentation of the lab rig to facilitate capture of interactions by the app;
causing execution of the app by the lab rig;
recording instrumentation data from the lab rig during execution of the app, the instrumentation data including system interactions made by the app and network traffic initiated by the app; and
upon completion of the non-emulated dynamic analysis, causing the lab rig to execute a service returning the lab rig to a clean state, wherein causing the lab rig to execute a service returning the lab rig to a clean state comprises:
auto-rooting the lab rig,
installing native hooks and custom loader to the lab rig,
installing custom modules to the lab rig, and
auto connecting the lab rig to one or more predefined networks,
generate, based on analyzing the app, a set of risk issues presented by the app; and output the set of risk issues.

* * * * *